(12) United States Patent
Giversen et al.

(10) Patent No.: US 6,386,089 B2
(45) Date of Patent: May 14, 2002

(54) HYDRAULIC STEERING ARRANGEMENT

(75) Inventors: Svend Giversen; Johan van Beek, both of Sønderborg; Lars Mortensen, Augustenborg; Ole Vincentz Sørensen, Nordborg, all of (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 09/795,640

(22) Filed: Feb. 28, 2001

(30) Foreign Application Priority Data

Mar. 7, 2000 (DE) .......................................... 100 11 015

(51) Int. Cl.[7] .............................................. F15B 13/043
(52) U.S. Cl. ........................................... 91/444; 91/459
(58) Field of Search .................................. 91/444, 459

(56) References Cited

U.S. PATENT DOCUMENTS 5,497,692 A * 3/1996 Marcott ..................... 91/459

* cited by examiner

Primary Examiner—Gerald A. Michalsky
(74) Attorney, Agent, or Firm—Lee, Mann, Smith, McWilliams, Sweeney & Ohlson

(57) ABSTRACT

A hydraulic steering arrangement, having a steering value, which connects a steering motor with a pump, and which has a slide with two front sides, the slide being adjustable by means of a pressure fluid both through a hydraulic steering unit with a steering hand wheel and through an electro hydraulic steering unit with a control pressure generator. The two steering units have working connections and the front sides of the slide are connected with shuttle valves, each of which is connected with hydraulic steering unit on the one side and with the electro hydraulic steering unit on the other side. A valve arrangement connects the working connection of both steering units, which has the highest pressure, with one front side of the slide, and the working connection of both steering units, which has the lowest pressure, with the other front side of the slide.

14 Claims, 1 Drawing Sheet

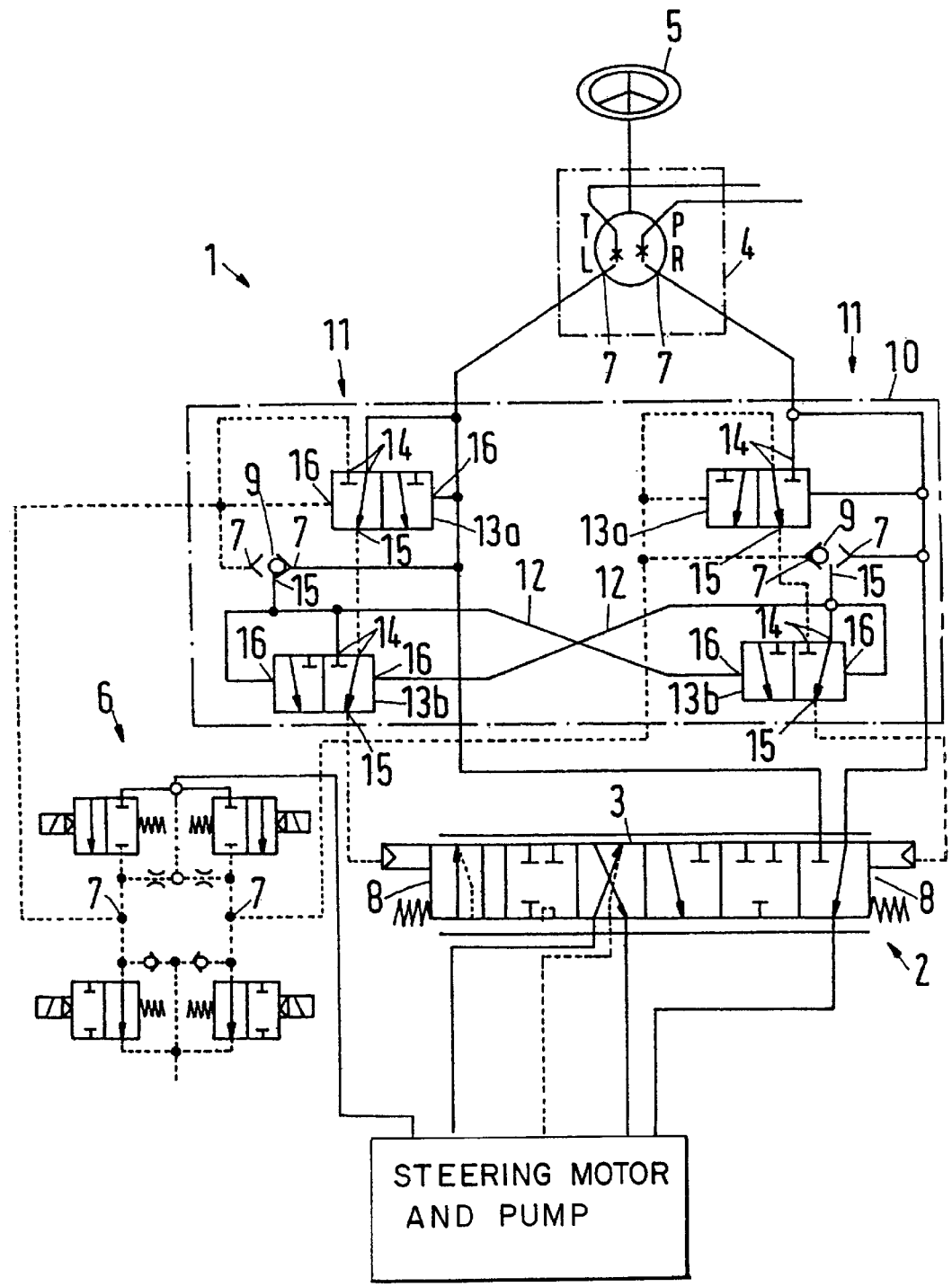

HYDRAULIC STEERING ARRANGEMENT

BACKGROUND OF THE INVENTION

The invention concerns a hydraulic steering arrangement, having a steering valve, which connects a steering motor with a pump, and which has a slide with two front sides, the slide being adjustable by means of a pressure fluid both through a hydraulic steering unit with a steering hand wheel and through an electro hydraulic steering unit with a control pressure generator, the two steering units having working connections and the front sides of the slide being connected with shuttle valves, each of which being connected with the hydraulic steering unit on the one side and with the electro hydraulic steering unit on the other side.

A steering arrangement of this kind is known, for example, from the post-published German patent application 199 31 143.9. In this document, each front side of the slide is connected direct in series with a shuttle valve. Each of the two shuttle valves is acted upon by a working pressure of the hydraulic steering unit and a working pressure of the electro hydraulic steering unit. In this connection, each front side of the slide is acted upon by the higher working pressure available at its series-connected shuttle valve. Thus, the steering valve is operable both via the hydraulic and the electro hydraulic steering unit. As the hydraulic steering unit can build up the largest working pressure of the steering arrangement, the hydraulic steering unit can at any time be used to control the vehicle. In this connection, the reaction time of the steering unit depends on the pressures, which act on both front sides of the slide.

SUMMARY OF THE INVENTION

The invention is based on the task of reducing the reaction time.

In a hydraulic steering arrangement as mentioned in the introduction, this task is solved in that a valve arrangement is provided, which, during normal operation, connects the working connection of both steering units, which has the highest pressure, with one front side of the slide, and the working connection of both steering units, which has the lowest pressure, with the other front side of the slide.

Thus, it is ensured that during normal operation of the hydraulic steering unit the highest available pressure always works together with the lowest pressure at the steering valve, meaning that the largest pressure difference acts across the slide. During normal operation, the lowest pressure comes from a tank connection of the hydraulic steering unit, assuming that both working connections R, L of the hydraulic steering unit have the same pressure, when being connected at the same time with the tank connection T. During normal operation, this is the case when only the electro hydraulic steering unit is activated. In this connection, the tank connection is connected with a tank or another pressure sink. During normal operation this gives the maximum possible pressure difference and the shortest possible reaction time.

Preferably, the valve arrangement has two branches, and in each branch one working connection of the hydraulic steering unit or one working connection of the electro hydraulic steering unit is connectable with one front side of the slide. Each of the two branches thus combines two paths, which are acted upon by pressure from the various steering units. This simple arrangement of the pressure paths reduces the costs. Additionally, the arrangement of the two pressure paths of a steering unit in different branches provides an improved working reliability of the steering arrangement.

Further, it is preferred that each branch has one path for a higher and one path for a lower of two working pressures. Thus, a predetermined path is allocated to the individual pressures according to their size and relative to the other pressure of the same path, which enables simplified switching arrangements and thus also a more reliable switching operation.

It is particularly preferred that each branch has at least one cross connection to the other branch, through which an adjustment pressure can act upon a valve of the other branch. This increases the number of switching functions of the valve arrangement, which provides an optimised pressure admission of the steering valve.

It is advantageous that the hydraulic steering unit supplies a higher pressure than the electro hydraulic steering unit. This ensures that the vehicle can at any time be steered by means of a manual operation of the hydraulic steering unit. This ensures a high reliability of the steering arrangement.

Further, it is advantageous that each of the two branches has at least two three/two-way valves and at least one shuttle valve. These valves provide a large number of switching opportunities, the simple embodiment of the individual valves reducing the costs and ensuring a stable operation.

Preferably, the first three/two-way valve of a branch, seen from a steering unit, is controlled so that it is penetrable by the lower of the two pressures ruling at the working connections of the steering unit. Thus, the lower pressure of the two branches is already branched at an early stage. This ensures that it is with a high reliability available in both branches, to act upon the front sides of the slide, each being connected in series with one of the two branches.

Additionally, it is preferred that the first three/two-way valve of each branch has two inlet connections, each connected with a steering unit, and an outlet, which is connected with an inlet connection of a downstream-connected second three/two-way valve, the first three/two-way valve being operable via adjustment connections, which again are connected with one of the connections between the inlet connections and the steering units. This simple embodiment of the valve enables an inexpensive and reliable switching of two ruling pressures in such a way that the lower pressure is passed on.

It is advantageous that the shuttle valve of a branch has two working connections, one being connected with the hydraulic steering unit, one with the electro hydraulic steering unit. The shuttle valve has a very simple embodiment and is penetrable by the higher of two pressures. Thus, the shuttle valve arranged here ensures lower costs and a reliable passing on of the higher of the ruling pressures.

It is advantageous that the outlet of the shuttle valve is connected with an inlet connection and an adjustment connection of the second three/two-way valve and with the cross connection. The consequence of this is that the highest pressure ruling in any of the two branches is now available as adjustment pressure in both branches, thus permitting an optimisation of the switching processes.

Further, it is advantageous that the cross connection connects the outlet of the shuttle valve of the one branch with an adjustment connection of the second three/two-way valve of the other branch. This permits that in an operation reliable and cost effective way the highest pressure ruling in the other branch is always acting as adjustment pressure on the two second three/two-way valves.

It is favourable that the second three/two-way valve of a branch, seen from the direction of a steering unit, is adjustable via an adjustment connection, which is connected with one of the cross connections, and via an adjustment connection, which is connected with the outlet of the shuttle valve of the branch, and has an outlet, which is connected with a front side of the slide. This arrangement makes it possible that the connection of a branch with the downstream-connected front side of the slide is operable by means of pressures from both branches. Thus, the pressure application of the valve can be optimised.

Further, it is advantageous that the highest of the pressures, which are passed on by the two shuttle valves of the valve arrangement, operates the second three/two-way valves of the two branches. Thus, the two connections between the branches and their downstream-connected front side of the slide are operated by the highest available pressure. This causes a simplified and reliable adjustment of both switching processes.

It is advantageous that each of the second three/two-way valves is operated so that the one of the second three/two-way valves of both branches being acted upon by the highest of the pressures passed on by the two shuttle valves of the valve arrangement, passes on this pressure to the one front side of the slide, and the other second three/two-way valve passes on the lower of the pressures, which rules at the two inlet connections, to the other front side of the slide. Thus, it is ensured that between the two front sides of the slide, which are acted upon by one of the pressures of the series-connected branch, the highest possible pressure difference is ruling. For the normal operation, this means that on one side the steering valve is connected with the working pressure of a tank connection of the hydraulic steering unit and on the other side with the working pressure of the pump connection of the activated steering unit. In this way the shortest possible reaction time for the steering is obtained.

BRIEF DESCRIPTION OF THE DRAWING

In the following, the invention is described in detail on the basis of a preferred embodiment in connection with the drawing, showing:

Only FIGURE a schematic view of a hydraulic steering unit

DESCRIPTION OF THE PREFERRED EMBODIMENT

A hydraulic steering arrangement 1 has a steering valve 2 with a slide 3 and a hydraulic steering unit 4 with a steering handwheel 5 and an electro hydraulic steering unit 6 with a control pressure generator. The hydraulic steering unit 4 is a traditional steering unit with two mutually rotatable slides. In this connection, the steering hand-wheel rotates one of the two slides, thus releasing a path from a pump connection P to one of the working connections 7 (L, R), while the other working connection 7 (R, L) is connected with a tank connection T.

Further, the hydraulic steering arrangement has a valve arrangement 10 consisting of shuttle valves and three/two-way valves. The outlet of the steering valve 2 is connected with a steering motor, which operates the steered wheels of a vehicle (not shown).

The hydraulic pressures, which are used for the operation of the steering valve 2, can be produced in two different ways. Firstly, the hydraulic pressures are produced by the control pressure generator of the electro hydraulic steering unit 6 and supplied to two front sides 8 of the slide 3 of the steering valve 2 via the valve arrangement 10. However, the hydraulic pressures can also be produced through an activation of the hydraulic steering unit 4. The working connections 7 of the hydraulic steering unit 4 can also be connected with the front sides 8 of the slide 3 via the valve arrangement 10.

The valve arrangement 10 has two branches 11, each of which having two three/two-way valves 13a, 13b and a shuttle valve 9. Each branch 11 is acted upon by a pressure from each of the two steering units. In the operation example of the embodiment according to the Fig., the left branch 11 is connected with the working connection 7 of the hydraulic steering unit 4, which is acted upon by the tank connection T. Additionally, the left branch 11 is connected with a working connection 7 of the electro hydraulic steering unit. The second working connection 7 of the electro hydraulic steering unit 6 is connected with the right branch 11 of the valve arrangement, together with the second working connection of the hydraulic steering unit, which is acted upon by the pump connection P.

Seen from the direction of a steering unit, firstly the first three/two-way valve 13a of each steering unit is acted upon by a pressure from both of the steering units 4, 6. Both connections between the two steering units and a first three/two-way valve 13a have additional connections with its two adjustment connections 16. Both working pressures ruling at two inlet connections 14 of the respective first three/two-way valves 13a thus at the same time also act upon the three/two-way valve 13a as adjustment pressure via the adjustment connections 16. For this purpose, the first three/two-way valve 13a of both branches 11 is made so as to be penetrable for the lower of the two working pressures ruling. The lower working pressure is now passed on to a downstream-connected three/two-way valve 13b via the outlet 15.

Next to the first three/two-way valve 13a, the two working connections 7 of both steering units, which act upon a branch with working pressure, are also connected with the shuttle valve 9 of the branch 11 in question. The outlet 15 of this valve 9 is connected with an inlet connection 14 and an adjustment connection 16 of the second three/two-way valve 13b of each individual branch 11 and via a cross connection 12 with an adjustment connection 16 of the second three/two-way valve 13b of the other branch 11. Thus, the pressure passed on by a shuttle valve 9 is available as both working pressure and adjustment pressure for the downstream-connected second three/two-way valve 13b of one of the branches and as adjustment pressure for the second three/two-way valve 13b of the other branch.

Through the cross connections 12, a comparison of the respective highest pressures of both branches 11, which are passed on by the shuttle valves 9 is possible. The two second three/two-way valves 13b are connected so that in the branch, in which the highest of the pressures, which are passed on by the shuttle valves 9, is available, this pressure is also passed on by the second three/two-way valve 13b of the same branch to the downstream-connected front side 8 of the slide 3. As explained in the following, consequently, during normal operation, at least one front side 8 of the slide is connected with a working connection of the hydraulic steering unit.

The pressure admission on the hydraulic steering arrangement is made so that the hydraulic steering unit 4 can at any time pass on a higher pressure than the electro hydraulic steering unit 6. Additionally, experience shows that the pressure in the lines of the electro hydraulic steering unit are built up to the size of 4 to 5 bar due to a control loop, when the steering unit is not activated.

An operation of the steering handwheel 5 will thus, during normal operation, cause that both the highest and the lowest working pressure of the valve arrangement are supplied by the hydraulic steering unit 4. In this connection, the highest pressure, which comes from the pump connection of the hydraulic steering unit 4, acts in one branch 11, and the lowest working pressure, which comes from the tank connection T of the hydraulic steering unit 4 acts in the other branch 11. On the other hand, on an operation of the steering handwheel during normal operation, the working pressures of the electro hydraulic steering unit 6 will have a size, which lies between the working pressure of the tank connection T and the pump connection P of the hydraulic steering unit 4. Thus, the two second three/two-way valves 13b of the valve arrangement 10 are operated by the highest pressure of the pump connection of the hydraulic steering unit in such a way that it is passed on to the one front side 8 of the slide 3, whereas the lowest pressure, which comes from the tank connection T of the hydraulic steering unit 4, is connected with the other front side 8 of the slide 3 via the other branch 11.

When, however, not the hydraulic steering unit 4, but the electro hydraulic steering unit 6 is operated, then the latter can build up the highest working pressure. Both working connections 7 of the hydraulic steering unit 4 are now connected with the tank and have the lowest working pressure. Consequently, the highest working pressure of the electro hydraulic steering unit 6 operates the two second three/two-way valves 13b of the valve arrangement 10 in such a way that this highest working pressure of the electro hydraulic steering unit 6 is connected with a front side 8 of the slide 3 via a branch 11. The lowest working pressure, which comes from the working connection 7 of the hydraulic steering unit 4, which acts upon the other branch 11, is connected with the other front side 8 of the slide 3.

In case that during a control via the electro hydraulic steering unit 6, the hydraulic steering unit 4 is also operated, the hydraulic steering unit 4 can now build up a higher working pressure than the electro hydraulic steering unit 6. The two second three/two-way valves 13b are thus operated in such a way that the branch with the highest working pressure of the hydraulic steering unit 4 is connected with one of the front sides of the slide 3 in such a way that the highest working pressure of the hydraulic steering unit 4 acts upon the downstream-connected front side 8 of the slide 3. Via the other branch 11, on the other hand, the lowest working pressure available is led to the other front side 8 of the slide 3.

What is claimed is:

1. Hydraulic steering arragement having a steering valve which connects a steering motor with a pump, the steering valve having a slide with two front sides, the slide being adjustable by means of a pressure fluid both through a hydraulic steering unit having a steering hand wheel and through an electro hydraulic steering unit having a control pressure generator, the two steering units having working connections and the front side of the slide being connected to shuttle valves, each of which being connected with the hydraulic steering unit on one side and with the electro hydraulic steering unit on a second side, and including a valve arrangement, which, during normal operation, connects the working connection of both steering units, which has highest pressure, with one front side of the slide, and the working connection of both steering units, which has lowest pressure, with the other front side of the slide.

2. Steering arrangement according to claim 1, in which the valve arrangement has two branches, and in each branch one working connection of the hydraulic steering unit or one working connection of the electro hydraulic steering unit is connectable with one front side of the slide.

3. Steering arrangement according to claim 2, in which each branch has one path for a higher and one path for a lower of two working pressures.

4. Steering arrangement according to claim 2, in which each branch has at least one cross connection to the other branch, through which an adjustment pressure acts upon a valve of the other branch.

5. Steering arrangement according to claim 2, in which each of the two branches has at least two three/two-way valves and at least one shuttle valve.

6. Steering arrangement according to claim 5, in which the first three/two-way valve of a branch, downstream of a steering unit, is controlled so that it is penetrable by the lower of the two pressures ruling at the working connections of the steering unit.

7. Steering arrangement according to claim 6, in which the first three/two-way valve of each branch has two inlet connections, each connected with a steering unit, and an outlet, which is connected with an inlet connection of a downstream-connected second three/two-way valve, the first three/two-way valve being operable via adjustment connections, which are connected with one of the connections between the inlet connections and the steering units.

8. Steering arrangement according to claim 7, in which the shuttle valve of a branch has two working connections, one being connected with the hydraulic steering unit, one being connected with the electro hydraulic steering unit.

9. Steering arrangement according to claim 8, in which the outlet of the shuttle valve is connected with an inlet and an adjustment connection of the second three/two-way valve and with a cross connection.

10. Steering arrangement according to claim 9, in which the cross connection connects the outlet of the shuttle valve of the one branch with an adjustment connection of the second three/two-way valve of the other branch.

11. Steering arrangement according to claim 5, in which the second three/two-way valve of a branch, downstream of a steering unit, is adjustable via an adjustment connection, which is connected with a cross connection, and via an adjustment connection, which is connected with an outlet of a shuttle valve of the branch, and has an outlet, which is connected with a front side of the slide.

12. Steering arrangement according to claim 5, in which the highest of the pressures, which are passed on by the two shuttle valves of the valve arrangement, operates the second three/two-way valves of the two branches.

13. Steering arrangement according to claim 12, in which each of the second three/two-way valves is operated so that one of the second three/two-way vales of booth branched being acted upon by the highest of the pressures passed on by the two shuttle valves of the valve arrangement, passes on this pressure to the one front side of the slide, and the other second three/two-way valve passes on the lower of the pressures, which rules inlet connections of the three/two-way valves, to the other front side of the slide.

14. Steering arrangement according to claim 1, in which the hydraulic steering unit supplies a higher pressure than the electro hydraulic steering unit.

* * * * *